United States Patent
Shiraishi et al.

(10) Patent No.: US 7,518,763 B2
(45) Date of Patent: Apr. 14, 2009

(54) IMAGE READING APPARATUS AND IMAGE READING MODULE

(75) Inventors: Ryuuichi Shiraishi, Kanagawa (JP); Shunsuke Hamasuna, Kanagawa (JP); Yuichi Mikuni, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 773 days.

(21) Appl. No.: 10/937,332

(22) Filed: Sep. 10, 2004

(65) Prior Publication Data
US 2005/0162712 A1 Jul. 28, 2005

(30) Foreign Application Priority Data
Jan. 23, 2004 (JP) ............... P2004-015167

(51) Int. Cl.
*H04N 1/04* (2006.01)
(52) U.S. Cl. .............. 358/475; 358/496; 358/498; 358/408; 358/483; 358/474
(58) Field of Classification Search ........... 358/483, 358/482, 496, 498, 497, 494, 474, 484, 487, 358/506, 512–514, 505, 475, 509, 408; 250/208.1, 250/216, 239, 234–236; 399/211, 212, 367, 399/364; 355/23; 382/101, 318, 312
See application file for complete search history.

(56) References Cited

U.S. PATENT DOCUMENTS

| 5,293,431 | A | * | 3/1994 | Hayduchok et al. ......... 382/101 |
| 6,163,038 | A | * | 12/2000 | Chen et al. .................. 257/103 |
| 6,195,183 | B1 | * | 2/2001 | Fujimoto et al. ............ 358/514 |
| 6,493,061 | B1 | | 12/2002 | Arita et al. |
| 6,924,911 | B1 | * | 8/2005 | Ford et al. .................. 358/475 |
| 7,064,872 | B1 | * | 6/2006 | Jeran ............................ 358/475 |
| 7,317,561 | B2 | * | 1/2008 | Makino et al. ............. 358/496 |
| 2004/0057079 | A1 | * | 3/2004 | Ohsawa ...................... 358/2.1 |
| 2004/0095620 | A1 | * | 5/2004 | Lin ............................. 358/509 |

FOREIGN PATENT DOCUMENTS

| CN | 1429008 A | 7/2003 |
| JP | 2000-244718 A | 9/2000 |
| JP | A 2000-261614 | 9/2000 |
| JP | A 2002-111974 | 4/2002 |

\* cited by examiner

*Primary Examiner*—Cheukfan Lee
(74) *Attorney, Agent, or Firm*—Oliff & Berridge, PLC (57) ABSTRACT

A scanner is provided with an illumination lamp for emitting light to a first side of a document from one side of a transfer path and a CCD image sensor for receiving light reflected from the first side of the document, and a CIS provided in a document feeder is provided with an LED for emitting light to a second side of the document from the other side of the transfer path and a line sensor for receiving light reflected from the second side of the document. The illumination lamp is a xenon lamp, and the LED is a white LED having emission characteristics different from those of the xenon lamp. To the CIS, a filter is attached, which brings emission characteristics of light emitted from the LED onto a document closer to those of light emitted from the illumination lamp onto the document.

15 Claims, 10 Drawing Sheets

IMAGE READING APPARATUS AND IMAGE READING MODULE

BACKGROUND OF THE INVENTION

1. Field of the Invention

The present invention relates to an image reading apparatus which captures images on a document, and more specifically, an image reading apparatus which can capture images on both front and back sides of the document by single transfer.

2. Description of the Related Art

Conventionally, as reading apparatuses such as a copying machine, a facsimile and a scanner for computer inputs, image reading apparatuses (automatic double side reading apparatuses) have been used which automatically read image information on both front and back sides of a document without intervention of users. Among these automatic double side reading apparatuses, a method of reading by inverting the front and back sides of a document at a document inverting unit is widely used. When inputting image information by front-back inversion, after images on the front side are read by a specific document reading unit, this document is inverted and conveyed again to this specific document reading unit and images on the back side are read. However, in this automatic double side reading by method of front-back inversion, since it is required that the document is inverted after being ejected and conveyed again to the document reading unit, this double side reading takes a long time, and this deteriorates the yield of double side reading. Therefore, for example, there is an art which makes it possible that both sides of a document are automatically read by single transfer of the document without front-back inversion by providing image sensors on both front and back sides of a document path in which the document is conveyed.

In addition, in conventional image reading apparatuses, a method in which a document is irradiated with light from a light source using, for example, a fluorescent light, and light reflected from the document is read by an image sensor through a minification optical system, is widely used. As an image sensor using this method, for example, a one-dimensional CCD (Charge Coupled Device) sensor is available, which simultaneously processes one line. In this method, when reading of one line in the line direction (main scanning direction) is finished, the document is moved for a short distance in the direction (vertical scanning direction) orthogonal to the main scanning direction and the next line is read. This operation is repeated for the entire document size to complete reading of one page of the document. In addition, as a method for successively reading in the vertical scanning direction without movement of the document, it is also possible that reading in the vertical scanning direction is successively carried out by moving a plurality of mirrors by movers such as full-rate carriages or half-rate carriages.

In this reading method, as mentioned above, it is necessary that a document is irradiated with light from a light source and reflected light is read by a CCD sensor through some mirrors, so that the whole unit tends to be large in size. Particularly, in a case where a plurality of image sensors must be provided for reading both sides of a document without inversion, it is difficult to provide such a plurality of CCD sensors due to limitations of space. Therefore, in order to solve such a spatial problem, it has been considered that a small-shaped LED (Light Emitting Diode) is used as a light source and an image sensor called CIS (Contact Image Sensor) which reads images by, for example, a linear sensor through a selfoc lens, is used.

Generally, emission spectrum (relationship between an emission wavelength and emission intensity) greatly differs between an LED and a fluorescent light. Therefore, when a fluorescent light is used as a light source of one reading unit and an LED is used as a light source of the other reading unit, the difference in emission spectrum between the fluorescent light and the LED poses the following problem when color images formed on both sides of a document are read as monochrome images.

For example, a case where a spectral reflection of an image formed on a document has an inherent tendency (for example, including many images in blue) is considered. In the case, in a reading unit using a fluorescent light as a light source, when blue components are included in the emission spectrum of the fluorescent light, reading images corresponding to the densities of blue images can be outputted. On the other hand, in a reading unit using an LED as a light source, when blue components are rarely included in the emission spectrum of the LED, reading images corresponding to the densities of the blue images cannot be outputted, so that reading signals corresponding to high density are normally outputted. Namely, due to the difference in emission characteristics between the light sources, the density obtained with respect to the blue image differs between the front and back sides. This problem may also occur in cases where the image includes many components of other colors as well as the image including many blue components.

SUMMARY OF THE INVENTION

The present invention has been made in order to address such a technical problem to reduce the density difference in read data between the front and back sides in double side automatic reading in which images on both front and back sides of a document are read by single transfer of the document.

According to one aspect of the invention, there is provided an image reading apparatus including: a first reading unit that captures an image on a first side of a document, the first reading unit including a first light source for emitting light to the first side of the document from one side of a transfer path on which the document is conveyed and a first sensor for receiving light reflected from the first side of the document; a second reading unit that captures an image on a second side of the document, the second reading unit including a second light source, which has emission characteristics different from those of the first light source, for emitting light to the second side of the document from the other side of the transfer path and a second sensor for receiving light reflected from the second side of the document; and a filter that is provided between the second light source and the transfer path and brings the emission characteristics of the light emitted from the second light source onto the document closer to those of the light emitted from the first light source onto the document.

According to another aspect of the invention, there is provided an image reading apparatus including: a first reading unit that captures an image on a first side of a document as at least one of a color image and a monochrome image, the first reading unit including a first white light source for emitting light to the first side of the document from one side of a transfer path on which the document is conveyed and a first sensor for receiving light reflected from the first side of the document; and a second reading unit that captures an image on a second side of the document as a monochrome image, the second reading unit including a second white light source for emitting light to the second side of the document from the other side of the transfer path and a second sensor for receiving light reflected from the second side of the document.

According to still another aspect of the invention, there is provided an image reading module including: a white LED that emits light to a document; a reading sensor that captures light emitted from the white LED and reflected from the document as a monochrome image; and a housing that houses the white LED and the reading sensor.

BRIEF DESCRIPTION OF THE DRAWING

Embodiments of the present invention will be described in detail based on the followings, wherein.

DETAILED DESCRIPTION OF THE PREFERRED EMBODIMENTS

Hereinafter, embodiments of the present invention will be described in detail with reference to the accompanying drawings.

Figure 1:
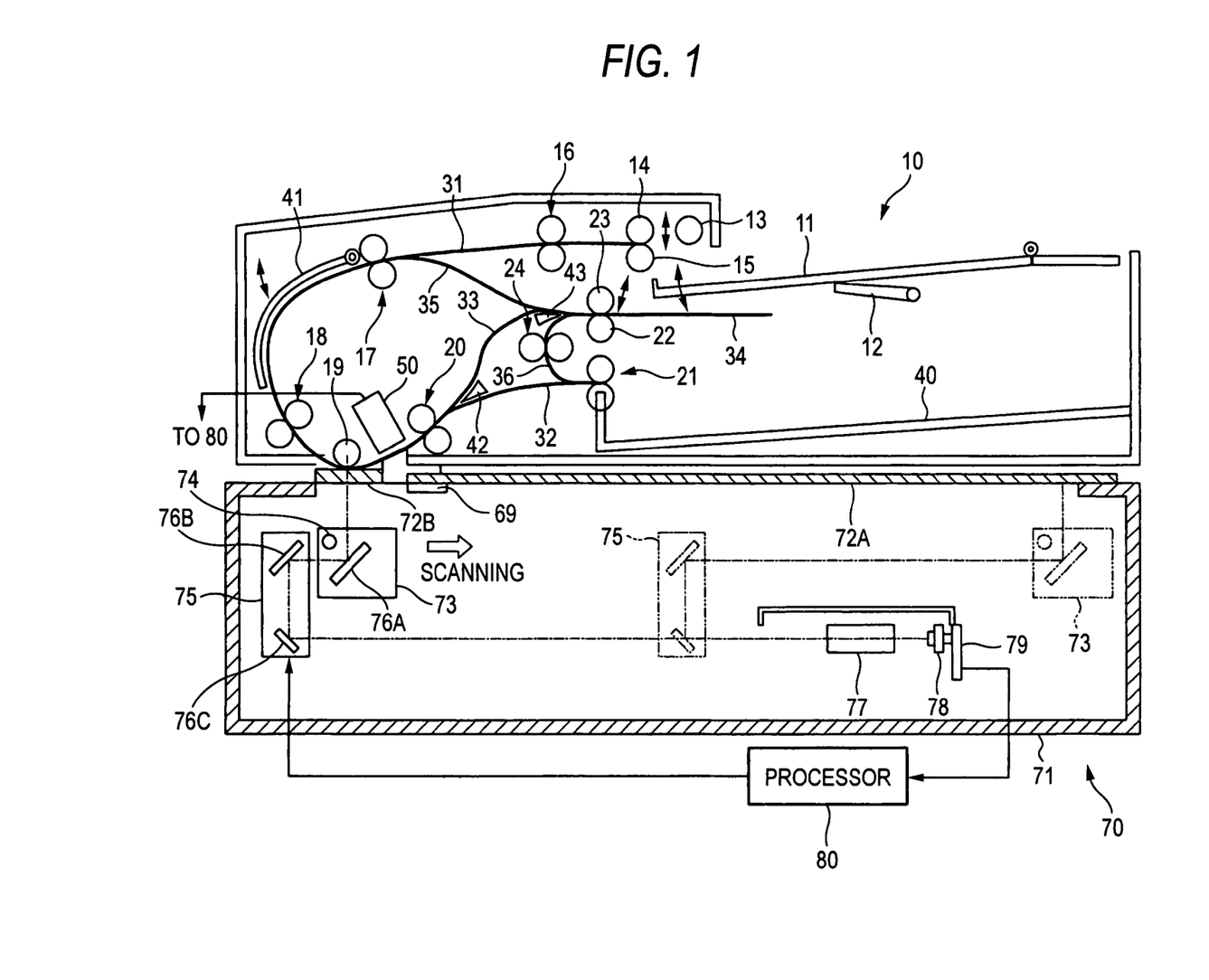
FIG. 1 is a drawing showing an image reading apparatus applied with this embodiment.

FIG. 1 is a drawing showing an image reading apparatus applied with this embodiment. This image reading apparatus is mainly divided into a document feeder 10 which conveys documents one by one from a bundle of stacked documents, a scanner 70 which reads-in images by scanning, and a processor 80 which processes read-in image signals.

The document feeder 10 has a document tray 11 for stacking a bundle of a plurality of documents, and a tray lifter 12 which raises and lowers the document tray 11. The document feeder further has a nudger roll 13 that conveys documents on the document tray 11 raised by the tray lifter 12, a feed roll that further conveys the documents conveyed by the nudger roll 13 to the downstream side, and a retard roll 15 which handles the documents supplied by the nudger roll 13 one by one. The first transfer path 31 to which the documents are conveyed first is provided with a take-away roll 16 that conveys the documents handled one by one to the downstream side roll, a pre-registration roll 17 that further conveys the documents to the downstream side roll and creates a loop, a registration roll 18 that stops once and restarts rotating in timing with the reading start, that supplies the documents while applying registration adjustment to the document reading unit, a platen roll 19 that assists the transfer of the document in being read, and an out roll 20 that further conveys the read-in document to the downstream side. Furthermore, the first transfer path 31 is provided with a baffle 41 that rotates around a fulcrum according to the loop status of the documents to be conveyed. Furthermore, between the platen roll 19 and the out roll 20, a CIS (Contact Image Sensor) 50 that is the second reading unit in this embodiment is provided.

On the downstream side of the out roll 20, a second transfer path 32 and a third transfer path 33 are provided, and a transfer path switching gate 42 for switching these transfer paths, an eject tray 40 for stacking documents that have been read-in, and a first eject roll 21 for ejecting documents onto the eject tray 40, are provided. The document feeder is further provided with a fourth transfer path 34 for switchback of the documents that have passed through the third transfer path 33, an inverter roll 22 and an inverter pinch roll 23 which are provided in the fourth transfer path 34 and actually switches the documents back, a fifth transfer path 35 which guides the documents switched back by the fourth transfer path 34 to the first transfer path 31 including the pre-registration roll 17, etc., again, a sixth transfer path 36 which ejects the documents switched back by the fourth transfer path 34 onto the eject tray 40, a second eject roll 24 which is provided in the sixth transfer path 36 and conveys the documents to be invert-ejected to the first eject roll 21, and an exit switching gate 43 for switching the fifth transfer path 35 and the sixth transfer path 36. These third transfer path 33, fourth transfer path 34, and fifth transfer path 35 form an inverting transfer path.

In a standby status, the nudger roll 13 is lifted up and held at its withdrawn position, and when conveying documents, it lowers to a nip position (document conveying position) and conveys a document top on the document tray 11. The nudger roll 13 and the feed roll 14 carries out document transfer by linking with a feed clutch (not shown). The pre-registration roll 17 creates a loop by butting the front end of the document with the registration roll 18 that is stopped. At the registration roll 18, when creating a loop, the front end of the document caught around the registration roll 18 for loop creation is returned to the nip position. When this loop is created, the baffle 41 opens around the fulcrum and functions so as not to obstruct the loop of the document. The take-away roll 16 and the pre-registration roll 17 hold the loop in reading-in. By this loop creation, the reading-in timing is adjusted and skews along with document transfer when reading-in is restrained, whereby the positioning adjustment function can be improved. In timing with the reading start, the registration roll 18 that has been stopped starts rotating and the document is pressed against a second platen glass 72B (described later) by the platen roll 19, whereby image data is read-in from the lower surface side.

When reading of a one-sided document or double side simultaneous reading of a double-sided document is finished, the transfer switching gate 42 guides a document that has passed through the out roll 20 to the second transfer path 32 and makes switching so as to eject the document onto the eject tray 40. On the other hand, in the case of double side sequential reading of a double-sided document, this transfer path switching gate 42 is switched so that the document is guided to the third transfer path 33 for inverting the document. In the case of double side sequential reading of a double-sided document, the nipping of the inverter pinch roll 23 is released by retracting the feed clutch (not shown) in an off status, and a document is guided to the inverter path (fourth transfer path 34). Thereafter, this inverter pinch roll 23 is nipped to guide a document to be inverted by the inverter roll 22 to the pre-registration roll 17, and conveys a document to be invert-ejected to the second eject roll 24 of the sixth transfer path 36.

The scanner 70 as a main body can be equipped with the abovementioned document feeder as a document conveyer, and supports this document feeder 10 by the scanner frame 71 in a manner enabling the feeder to open and close, and reads images on documents conveyed by the document feeder 10. This scanner 70 has, in the scanner frame 71 forming a casing, a first platen glass 72A for placing a document to be image-read in a state of rest, and a second platen glass 72B forming a light opening for reading a document being conveyed by the document feeder 10.

The scanner 70 as the first reading unit is at standstill under the second platen glass 72B, and has a full rate carriage 73 which reads images by scanning the entirety of the first platen glass 72A, and a half rate carriage 75 which supplies light obtained from the full rate carriage 73 to an imaging unit. The full rate carriage 73 is provided with an illumination lamp 74 as the first light source that irradiates the document with light, and a first mirror 76A that receives light reflected from the document. The half rate carriage 75 is provided with a second mirror 76B and a third mirror 76C which supply the light obtained from the first mirror 76A to the imaging unit. Furthermore, the scanner 70 has an imaging lens 77 which optically minifies optical images obtained from the third mirror 76C, a CCD (Charge Coupled Device) image sensor 78 as the first sensor that photoelectrically converts optical images formed by an imaging lens 77, and a driving circuit board 79 including the CCD image sensor 78, and image signals obtained by the CCD image sensor 78 are transmitted to the processor 80 through the driving circuit board 79. Herein, the CCD image sensor 78 is provided with a color sensor and a monochrome sensor, separately, whereby it becomes possible for the CCD image sensor to read images on a document as color images or monochrome images. Namely, the scanner 70 functions as a color/monochrome reading unit.

Herein, first, to read images on a document placed on the first platen glass 72A, the full rate carriage 73 and the half rate carriage 75 move in the scanning direction (direction of the arrow) at a ratio of 2 to 1. In this case, light of the illumination lamp 74 of the full rate carriage 73 is emitted onto the side to be read of the document, and light reflected from the document is reflected by the first mirror 76A, the second mirror 76B, and the third mirror 76C in order, and guided to the imaging lens 77. The light guided to the imaging lens 77 is imaged on the light receiving surface of the CCD image sensor 78. The CCD image sensor 78 is a one-dimensional sensor, which simultaneously processes one line. When reading of one line in the line direction (the main scanning direction) is finished, the full rate carriage 73 is moved in the direction (vertical scanning direction) orthogonal to the main scanning direction to read the next line of the document. This operation is carried out for the entirety of the document size, whereby reading of one page of the document is completed.

On the other hand, the second platen glass 72B is formed of a transparent glass plate having, for example, a long-length plate-shaped structure. The document conveyed by the document feeder 10 passes on this second platen glass 72B. At this point, the full rate carriage 73 and the half rate carriage 75 are stopped at the positions shown by the solid lines in FIG. 1. Reflected light of the first line of the document that has passed the platen roll 19 of the document feeder 10 is imaged on the imaging lens 77 through the first mirror 76A, the second mirror 76B, and the third mirror 76C, and the images are read by the CCD image sensor 78 as the first sensor in this embodiment. Namely, after images of one line in the main scanning direction are simultaneously processed by the CCD image sensor 78 that is a one-dimensional sensor, the next one line in the main scanning direction of the document conveyed by the document feeder 10 is read-in. After the front end of the document reaches the reading position of the second platen glass 72B, when the document passes through the reading position of the second platen glass 72B, reading of one page in the vertical scanning direction is completed.

In this embodiment, it is possible that the second side of the document is read by the CIS 50 that is the second reading unit at a time (does not mean simultaneously, but means during transfer of the same document) when the document is conveyed for reading of the first side of the document through the second platen glass 72B by the CCD image sensor 78 by stopping the full rate carriage 73 and the half rate carriage 75. Namely, by using the scanner 70 as the first reading unit and the CIS 50 as the second reading unit, during single transfer of a document to the transfer path, images on both front and back sides of this document can be read.

Figure 2:
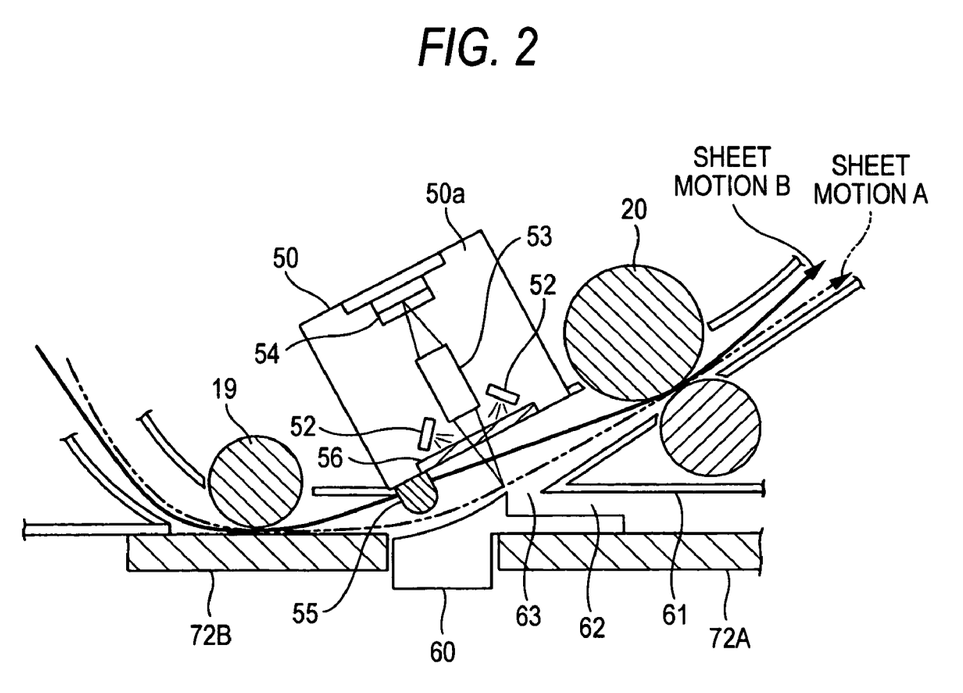
FIG. 2 is a drawing for describing a reading structure using a CIS.

FIG. 2 is a drawing for describing a reading structure using the CIS 50 as an image reading module. As shown in FIG. 2, the CIS 50 is provided between the platen roll 19 and the out roll 20. The one side (first side) of the document is pressed against the second platen glass 72B, and images on this first side are read by the CCD image sensor 78. On the other hand, at the CIS 50, images on the other side (second side) are read from the other opposite side through the transfer path for conveying the document. This CIS 50 has a housing 50a that is shaped rectangular parallelepiped and has an opening formed on the bottom, a filter 51 simultaneously serving as a cover attached to the opening of the housing 50a, an LED (Light Emitting Diode) 52 as a second light source that irradiates the second side of the document with light by transmission through the filter 51, a selfoc lens 53 as a lens array for condensing light reflected from the LED 52, and a line sensor 54 as a second sensor for reading light condensed by the selfoc lens 53. As the line sensor 54, a CCD or CMOS sensor, a close contact sensor or the like can be used, which can read an image with actual dimensions (for example, 297 mm length of A4). The line sensor 54 can read images on the document as monochrome images since it is provided with only a monochrome sensor. Namely, the line sensor 54 functions as a monochrome reading sensor, and the CIS 50 functions as a monochrome reading unit. In the CIS 50, images are read by using the selfoc lens 53 and the line sensor 54 without using a minification optical system, thereby simplifying the structure, downsizing the casing, and reducing power consumption.

In addition, in the case of image reading by the CIS 50, the transfer path forming this reading unit is provided with a control member 55 extending from the casing of the CIS 50, and a butting member 60 for butting a sheet pressed by the control member 55. At the downstream side of this butting member 60, a guide member 61 is provided, and between this guide member 61 and the butting member 60, an opening 63 is formed, and at a portion of the lower part of the guide member 61 continued to the opening 63, a dust hole 62 for collecting dust and dirt adhering to the surface of the document is provided. The control member 55 and the butting member 60 are provided in the direction orthogonal to the document transfer path (that is, the direction from the front side to the rear side of the document feeder) across the front side and the rear side of the document feeder corresponding to the position of the transfer path.

Figure 3:
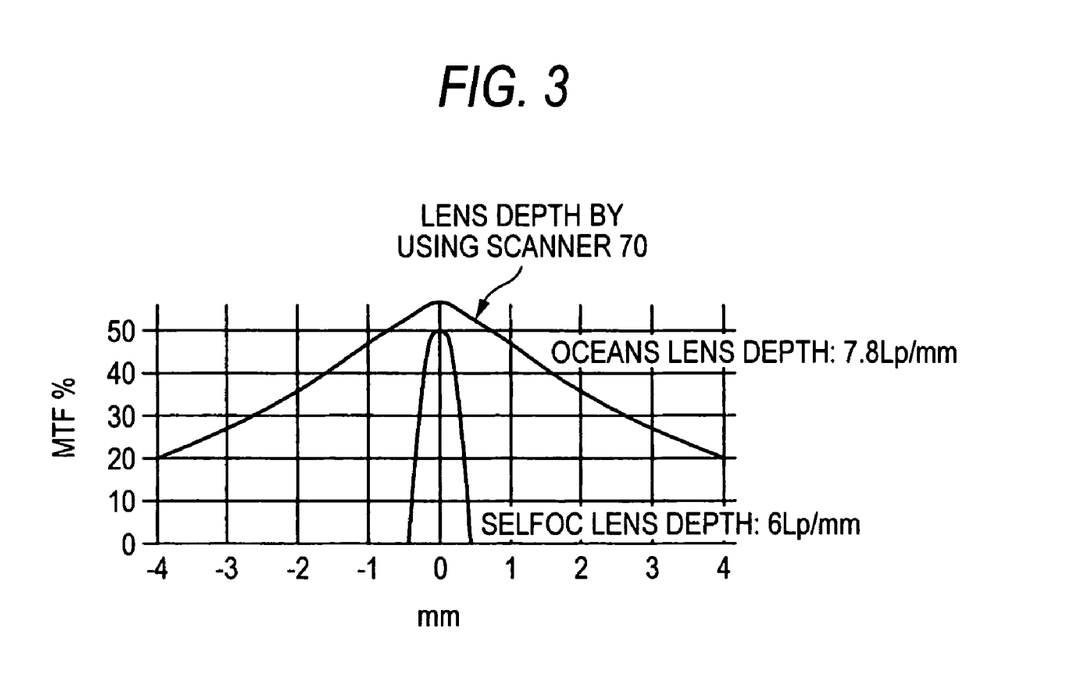
FIG. 3 is a diagram for describing a focal depth as imaging characteristics of a lens.

The CIS 50 uses the selfoc lens 53 as the optical imaging lens, so that its focal depth (depth of field) is shallow. FIG. 3 is a diagram for describing the focal depth as lens imaging performance. This FIG. 3 shows an example of MTF (Modulation Transfer Function) of the lens depth (7.8 Lp/mm) using a minification optical system of the scanner 70, etc., of this embodiment and an example of MTF of the lens depth (6 Lp/mm) using the selfoc lens 53. This "Lp/mm" indicates a value showing how many black and white ladder patterns exist in 1 mm. The MTF indicates how faithfully the spatial information (contrast) of a subject is reproduced from the low frequency band (rough stripe) to the high frequency band (fine stripe) by using frequency characteristics. The vertical axis of FIG. 3 indicates MTF (%), and the horizontal axis indicates a condition of separating on the 1 mm basis from the best focal position on the platen glass, and a condition of approaching on the 1 mm basis to the best focal position.

For example, when the target value of MTF is set to 20% or more for reading a document, in the case where the scanner 70 of this embodiment is used, even at ±4 mm, fixed focusing is obtained and a deep depth of field can be secured. On the other hand, when the selfoc lens 53 is used and the target value of MTF is set to 20% or more, the depth of field becomes as shallow as ±0.3 mm, and this value is approximately ⅓ of that in the case using the scanner 70. Namely, when reading by using the CIS 50 of this embodiment, it is required that the document reading position is determined within a predetermined narrow range.

Therefore, in this embodiment, the control member 55 is provided and a document is conveyed by being pressed against the butting member 60 by the control member 55 so that the posture of the document between the platen roll 19 and the out roll 20 is stably controlled. The "sheet motion B" shown by the solid arrow in FIG. 2 shows the motion of a sheet when the control member 55 does not exist, and the "sheet motion A" shown by the alternate long and short two-dashed line shows the motion of a sheet when the control member 55 exists. The "sheet motion A" shows that the document is conveyed by being pressed against the butting member 60. Namely, by reading a document conveyed by the control member 55 while being pressed against the butting member 60, insufficient focusing is improved.

Next, the processor 80 shown in FIG. 1 is described.

Figure 4:
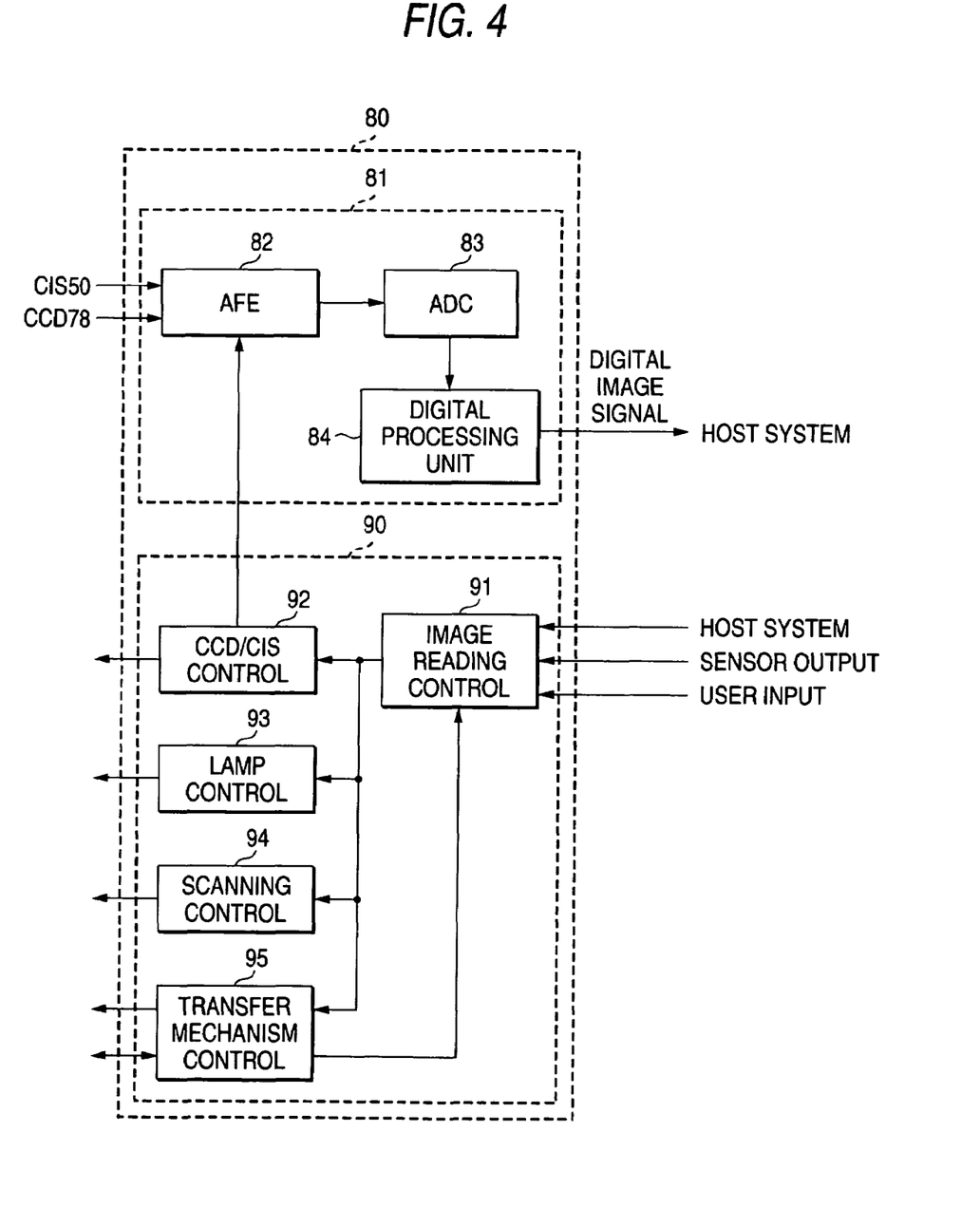
FIG. 4 is a block diagram for describing a processor.

FIG. 4 is a block diagram for describing the processor 80. The processor 80 applied with the invention mainly includes a signal processing unit 81 which processes image information obtained from sensors (the CCD image sensor 78 and the line sensor 54), and a control unit 90 which controls the document feeder 10 and the scanner 70. The signal processing unit 81 has an AFE (Analog Front End) 82 for processing analog signals, an ADC (Analog to Digital Converter) 83 for conversing analog signals into digital signals, and a digital processing unit 84 for applying various processing including shading correction and off-set correction, etc., to digital signals, and digital image signals processed by the digital processing unit 84 are outputted to a host system and outputted to, for example, a printer as image information.

On the other hand, the control unit 90 has an image reading control 91 for carrying out controls of the entirety of the document feeder 10 and the scanner 70 including various double side reading controls and one-side reading control, a CCD/CIS control 92 for controlling the CCD image sensor 78 serving as the first sensor and the CIS 50, a lamp control 93 for controlling the LED 52 of the CIS 50 and the illumination lamp 74 of the full rate carriage 73 in timing with reading, a scanning control 94 which turns a motor in the scanner 70 on/off and controls the scanning operations of the full rate carriage 73 and the half rate carriage 75, and a transfer mechanism control 95 which controls a motor in the document feeder 10, the operations of the various rolls and the feed clutch, and gate switching operations, etc. From these controls, control signals are outputted to the document feeder 10 and the scanner 70, and based on these control signals, operations of these devices can be controlled. The image reading control 91 sets a reading mode and controls the document feeder 10 and the scanner 70 based on control signals from the host system, sensor outputs detected according to, for example, the auto select reading function, and a selection made by a user, etc.

Herein, in this embodiment, when reading images by document transfer by the document feeder 10, a document conveyed to the platen roll 19 can be read by using the scanner 70 (CCD image sensor 78) through the second platen glass 72B, and can be read by using the CIS 50 provided in the document feeder 10. However, as mentioned above, the focal depth differs in the case of reading by the CCD image sensor 78 using the mechanism of the scanner 70 and in the case of reading by using the selfoc lens 53 of the CIS 50, resulting in a difference in resolution. Particularly, when reading color images of photographs, etc., color matching between these cases becomes difficult, and the image quality differs between these reading manners. Therefore, in this embodiment, a plurality of reading modes are prepared so as to make it possible to select an optimum mode based on the setting conditions of the devices, the type of document, and a selection made by a user.

Figure 5:
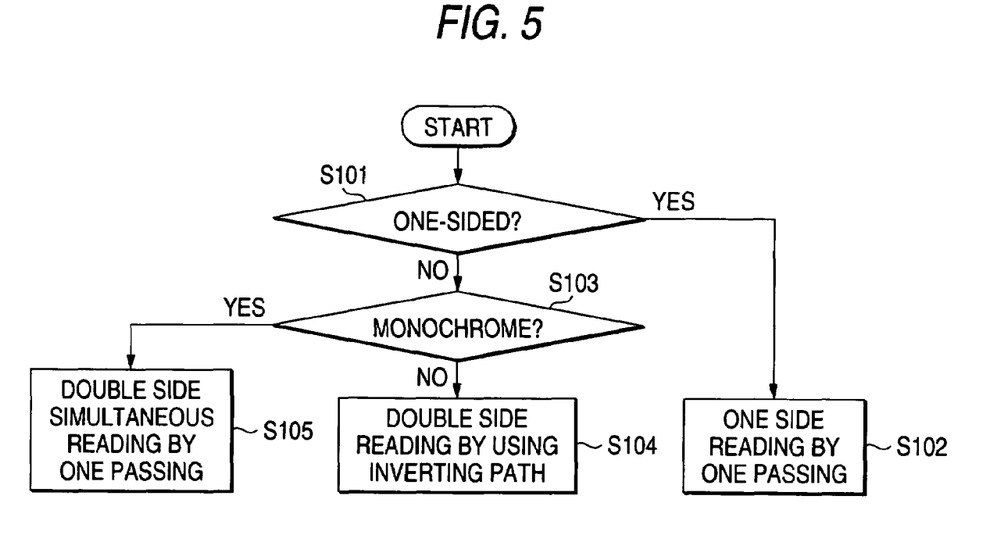
FIG. 5 is a flowchart showing an example of processing to be executed by an image reading control.

FIG. 5 is a flowchart showing an example of processing to be executed by the image reading control 91 shown in FIG. 4. In the image reading control 91, first, it is judged whether or not documents to be conveyed are one-sided documents (Step 101). This judgment can be made by, for example, a selection made by a user by using a control panel (not shown) provided on the scanner 70, and by sensors (not shown) provided on both sides of the first transfer path 31 before reading images when the auto select reading function works. Furthermore, it is considered that the judgment is made based on requirements from the host system or a selection made by a user through a network, etc. When the documents are judged as one-sided in this Step 101, one side reading is carried out by one passing (only one passing through the document transfer path without use of the inverting path) (Step S102). In this one side reading by one passing, any of a reading by the CCD image sensor 78 and reading by the CIS 50 can be selected, however, to realize image reading with higher image quality, it is preferable that reading by the CCD image sensor 78 is selected. In this case, on the document tray 11, the documents are set so that the image sides are turned up and the first page of the documents comes to the top, and documents are conveyed and read in order from the first page.

Herein, when the documents are not one-sided documents, that is, when the documents are double-sided, it is judged whether or not monochrome reading of the documents has been specified by a user (Step S103). This judgment of Step S103 is made based on a selection made by a user. Therefore, even when the documents are color documents, if the user desires monochrome reading, monochrome reading is selected. When monochrome reading is not carried out, that is, when color reading is carried out, double side reading is carried out by using the inverting path (Step S104). Namely, without reading by the CIS 50, the first and second sides of the documents are read by the CCD image sensor 78 as the first sensor. Thereby, for the first and second sides of the documents, double side reading with high image quality by using a reading method with a deep focal depth can be carried out.

On the other hand, when monochrome reading is carried out in Step S103, double side simultaneous reading is carried out by one passing without using the inverting path (Step S105). Namely, the first side is read by the CCD image sensor 78 as the first sensor, and in the same transfer path for reading, the second side is read by the CIS 50. Thereby, it is not necessary to convey the document twice to the same reading unit, and the document reading speed is improved and the transfer path is simplified. Therefore, document transfer troubles such as document jam, etc., can be prevented. As described above, "simultaneous reading" does not necessarily mean temporal synchronization, but means that both sides are read in the same period by one passing.

Next, the methods for conveying a document in the respective document reading modes are described with reference to FIGS. 6 and 7.

Figure 6A:
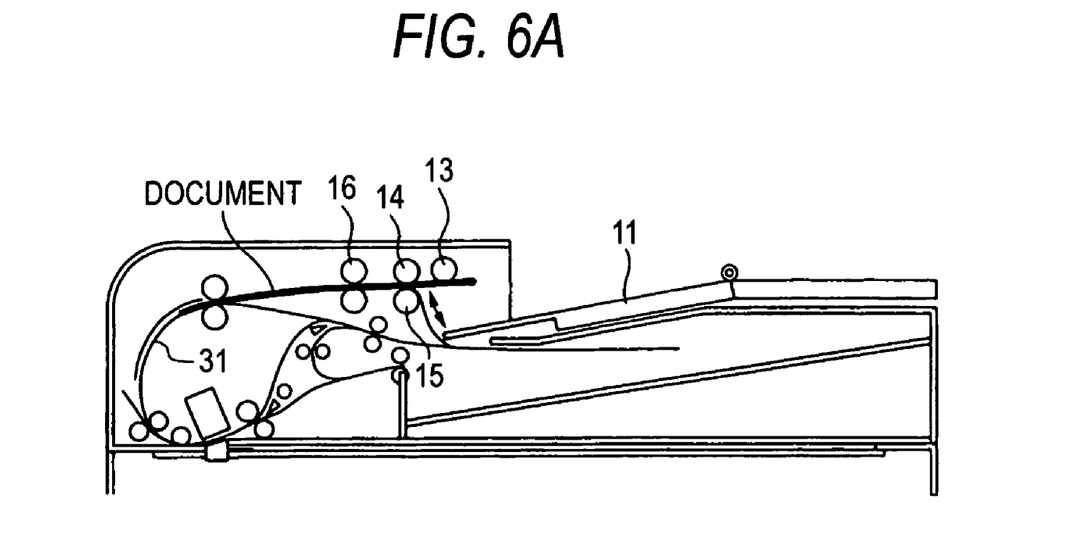
FIGS. 6A and 6B are diagrams for describing a document path in one side reading by one passing and double side simultaneous reading by one passing.
Figure 6B:
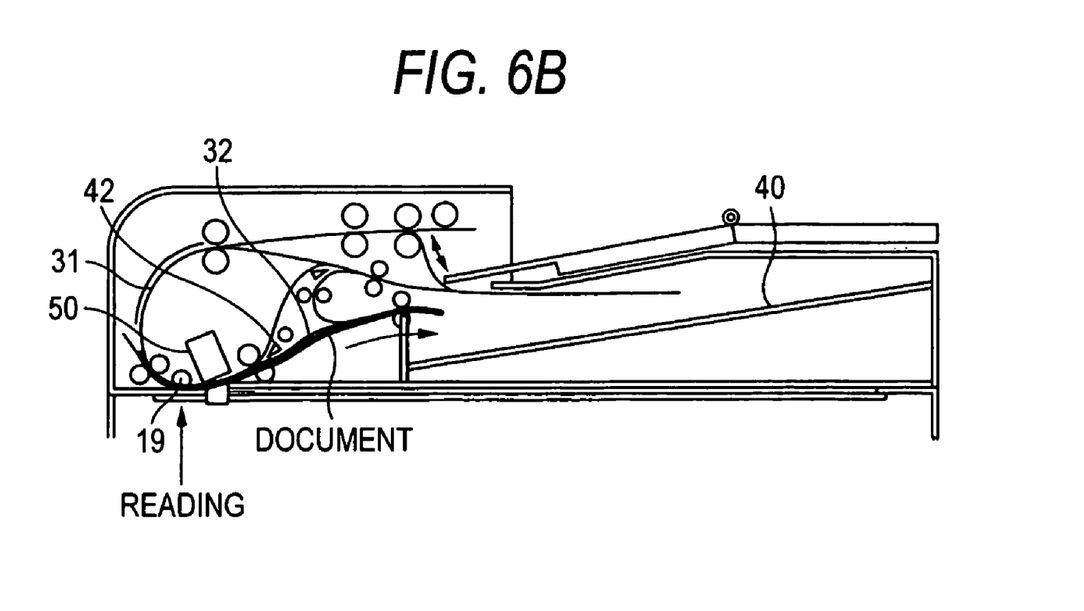

FIGS. 6A and 6B show a document path in the one-side reading mode by one passing shown in Step S102 of FIG. 5, and a document path in the case of double side simultaneous reading by one passing shown in Step S105, respectively. As shown in FIG. 6A, documents placed on the document tray 11 are successively supplied to the first transfer path 31 by the nudger roll 13, the feed roll 14, the retard roll 15, and the take-away roll 16. As shown in FIG. 6B, the supplied documents pass through the reading unit of the platen roll 19 and the reading unit of the CIS 50 and move to the second transfer path 32 by the transfer path switching gate 42, and are successively ejected onto the eject tray 40. In the case of one side reading, at the point of the platen roll 19, reading is carried out from below by using the CCD image sensor 78 of the scanner 70 shown in FIG. 1. As described above, one side reading by using the CIS 50 is also possible. In the case of double side simultaneous reading by using one passing, the first side is read by using the CCD image sensor 78 of the scanner 70, and the second side is read by using the CIS 50 during the same transfer period. Thereby, double side reading can be carried out by one document passing.

Figure 7A:
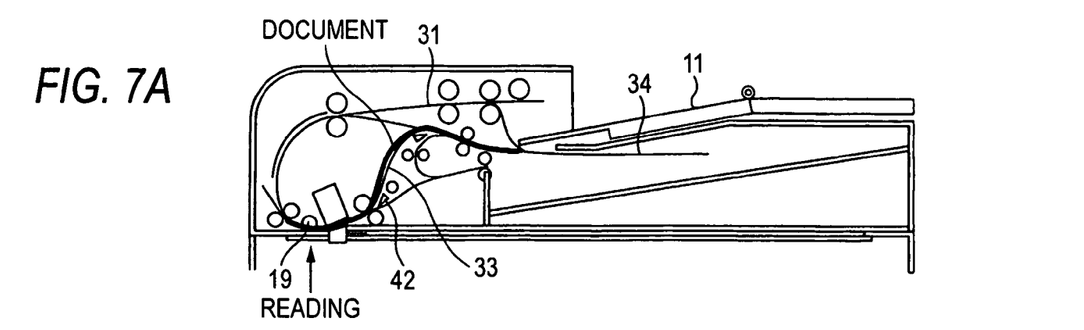
FIGS. 7A through 7D are drawings for describing the document path in double side reading by using an inverting path.
Figure 7B:
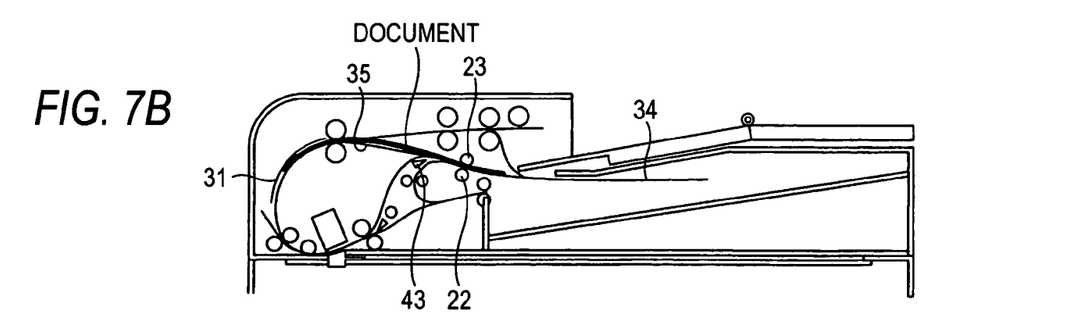

FIGS. 7A through 7B are drawings for describing double side reading by using the inverting path shown in Step S104 of FIG. 5. As shown in FIG. 7A, documents placed on the document tray 11 are successively supplied to the first transfer path 31, and read at the point of the platen roll 19 from below by using the CCD image sensor 78 of the scanner 70 shown in FIG. 1. Then, the documents pass through the third transfer path 33 by the transfer path switching gate 42 and move to the fourth transfer path 34. A document that has completely passed through the third transfer path 33 is switched back by the inverter roll 22 and the inverter pinch roll 23 and supplied to the fifth transfer path 35 as shown in FIG. 7B.

Figure 7C:
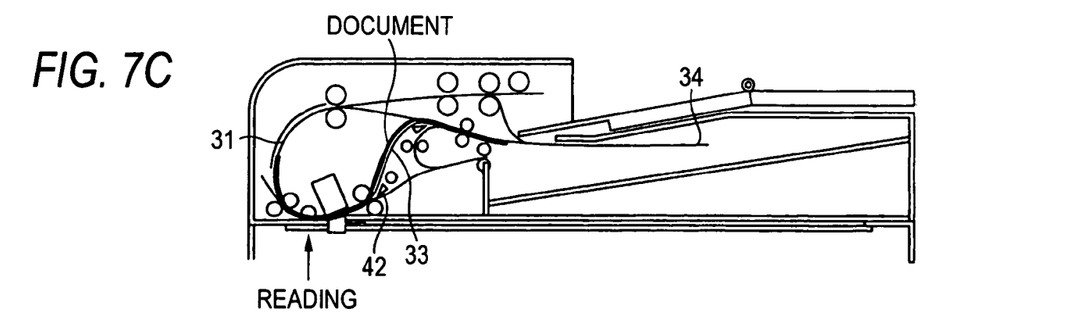
Figure 7D:
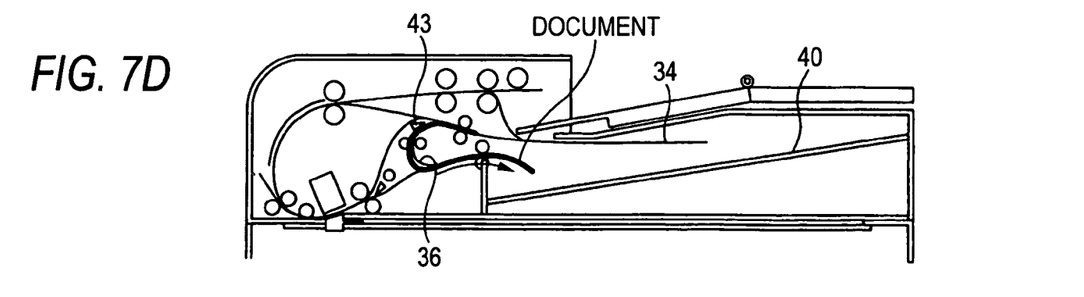

The document supplied to the fifth transfer path 35 is supplied to the first transfer path 31 again. Then, as shown in FIG. 7C, the document is read by the CCD image sensor 78 of the scanner 70 from below. At this point, the document is turned upside down from a state shown in FIG. 7A, and the second side that is the back side of the first side is read. The document whose second side has been read is upside down, and therefore, if the document is ejected onto the eject tray 40 as it is, the page numbers of the stacked documents after being read are disordered. Therefore, as shown in FIG. 7C, the document whose second side has been completely read is conveyed to the fourth transfer path 34 through the third transfer path 33 by using the transfer path switching gate 42. The document that has been supplied to the fourth transfer path 34 and completely passed through the section of the exit switching gate 43 is ejected onto the eject tray 40 through the sixth transfer path 36 by the exit switching gate 43 as shown in FIG. 7D. Thereby, in the first double side reading mode in which images on both front and back sides of documents are successively read, it becomes possible to correct the page order of the documents after being read.

Figure 8A:
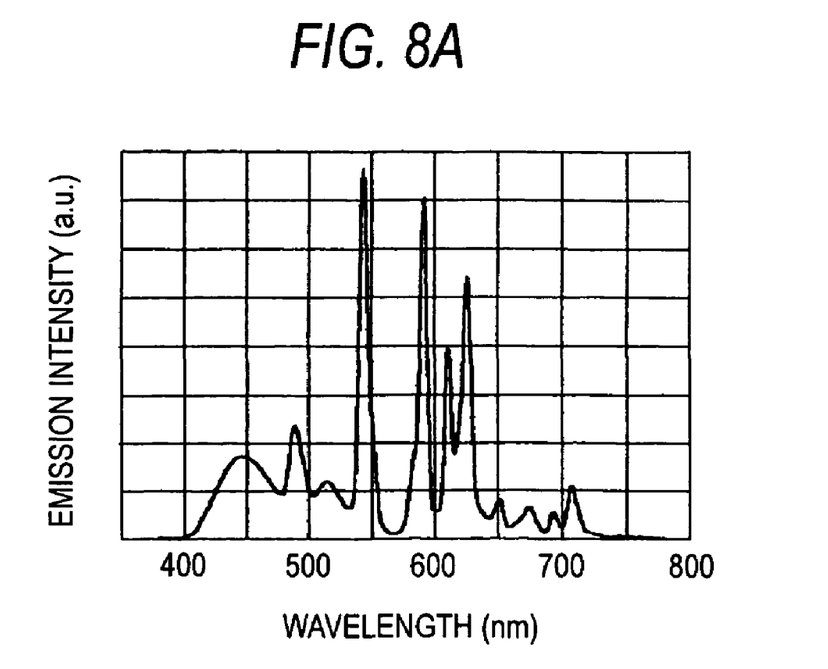
FIG. 8A shows wavelength-emission intensity characteristics of an illumination lamp (xenon lamp) used in a scanner.
Figure 8B:
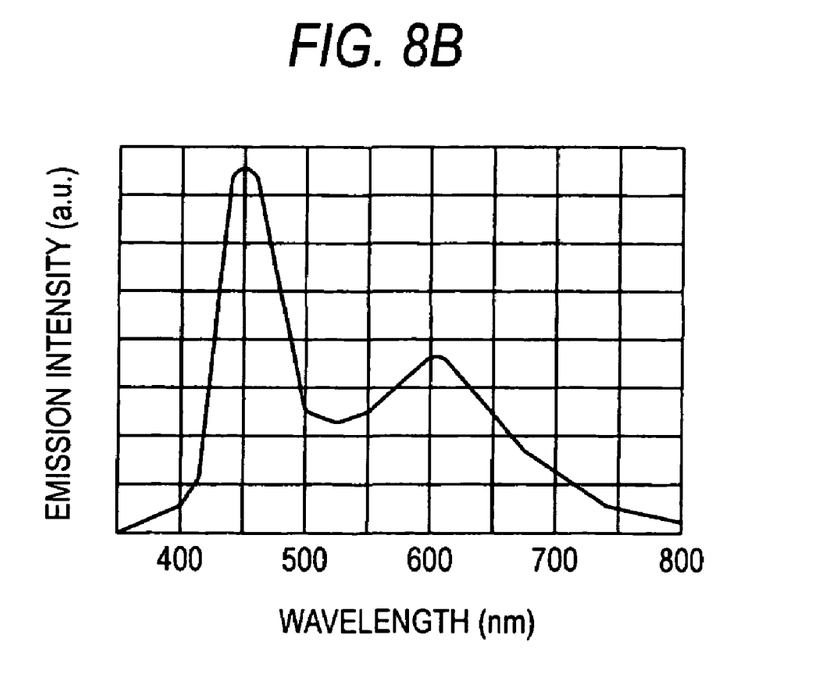
FIG. 8B shows wavelength-emission intensity characteristics of an LED (white LED) used in the CIS.

Herein, FIG. 8A shows the wavelength-emission intensity characteristics of the illumination lamp 74 (xenon lamp) as the first white light source to be used in the scanner 70, and FIG. 8B shows the wavelength-emission intensity characteristics of the LED 52 (white LED) to be used in the CIS 50.

In this embodiment, as the illumination lamp 74, a xenon lamp which emits light by means of xenon gas discharge is used. As seen in FIG. 8A, the xenon lamp emits light over almost the entire range of visible light wavelengths. Therefore, the illumination lamp 74 composed of a xenon lamp serves as a first white light source. On the other hand, as the LED 52, a so-called white LED is used which emits white light by using an LED that emits blue light or light having a near-ultraviolet wavelength by electroluminescence, and a fluorescent material which emits light by photoluminescence. As seen in FIG. 8B, the white LED also emits light over the entire range of visible light wavelengths. Therefore, the LED 52 composed of the white LED serves as a second white light source.

As seen in FIGS. 8A and 8B, the xenon lamp and the white LED emit light over the entire range of visible light wavelengths, however, their emission patterns are greatly different. The white light source mentioned herein means a light source which emits light over almost the entire range of visible light wavelengths, and it is unrelated to whether or not the resultant visible color is white.

Figure 9:
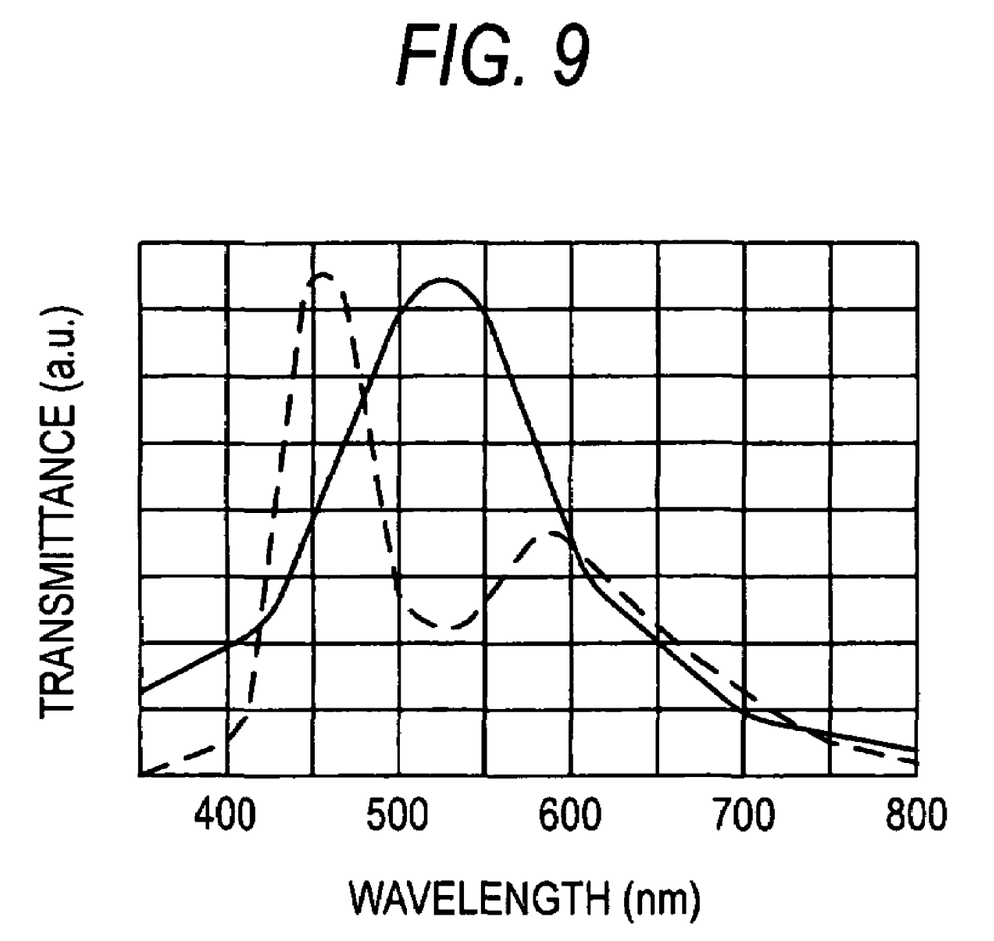
FIG. 9 is a diagram showing wavelength-transmittance characteristics of a filter to be attached to the CIS.

FIG. 9 shows the wavelength-transmittance characteristics of the filter 51 attached to the CIS 50. FIG. 9 also shows the emission pattern of the abovementioned LED 52 (white LED). The wavelength-transmittance characteristics of this filter 51 are determined on the basis of the following equation.

$$\text{Correcting filter characteristics} = \frac{\text{Xe lamp emission characteristics} \times \text{Imaging lens characteristics} \times \text{CCD image sensor sensitivity}}{\text{White LED emission characteristics} \times \text{Image sensor sensitivity}} \quad [\text{Equation 1}]$$

The filter 51 is formed by depositing a predetermined thin film according to required transmittance characteristics made of metal or oxide, etc., on a substrate made of a glass transparent in the visible range. In the CIS 50 in this embodiment, light emitted from the LED 52 permeates through the filter 51 twice before reaching the line sensor 54, so that the filter 51 is designed by considering this. Namely, designing is determined by shifting the filter 51 so as to increase its transmittance greater than the profile determined by Equation 1 in order to obtain a desired transmittance determined by Equation 1 by twice permeation through the filter 51.

In this embodiment, by attaching the filter 51 having the wavelength-transmittance characteristics designed based on Equation 1 to the CIS 50, the wavelength distribution of light emitted from the CIS 50 side onto the document, that is, light that has been emitted from the LED 52 and permeated through the filter 51 can be roughly matched with the wavelength distribution of the light emitted from the illumination lamp 74 (xenon lamp) of the scanner 70 onto the document. Thereby, the same image reading conditions can be set for the front and back sides of the document. Therefore, in this embodiment, when double side reading is carried out by one passing, that is, when images (in particular, color images) formed on both sides of the document are read as monochrome images, the image density can be matched between the front and back sides.

Furthermore, in this embodiment, since the LED 52 is used as the light source for the CIS 50 of the document feeder 10, in comparison with the case using a xenon lamp or the like as the light source, the CIS 50 and the document feeder 10 to which the CIS 50 is attached can be downsized and lightened in weight. Furthermore, by employing the LED 52 as a light source, the power consumption can be reduced to 10% or less than in the case of using a xenon lamp as the light source. Moreover, in this embodiment, the LED 52 is used as the light source of the CIS 50 attached to the document feeder 10, so that the CIS 50 can be downsized and the document feeder 10 can also be downsized. In addition, since the CIS 50 can be downsized, it becomes possible to form an inverting transfer path for inverting transfer of a document into the document feeder 10.

In the invention, in the CIS 50 having only the monochrome sensor for reading monochrome images as the line sensor 54, since the white LED that emits light in a wide wavelength band is used as the LED 52 for irradiating the document with light, shading of images can be reproduced in the entire visible light range when reading color images on a document as monochrome images.

In addition, in this embodiment, the filter 51 is attached to only the CIS 50, however, the invention is not limited to this, and it is possible that the filter is provided at the scanner 70 as appropriate.

Figure 10:
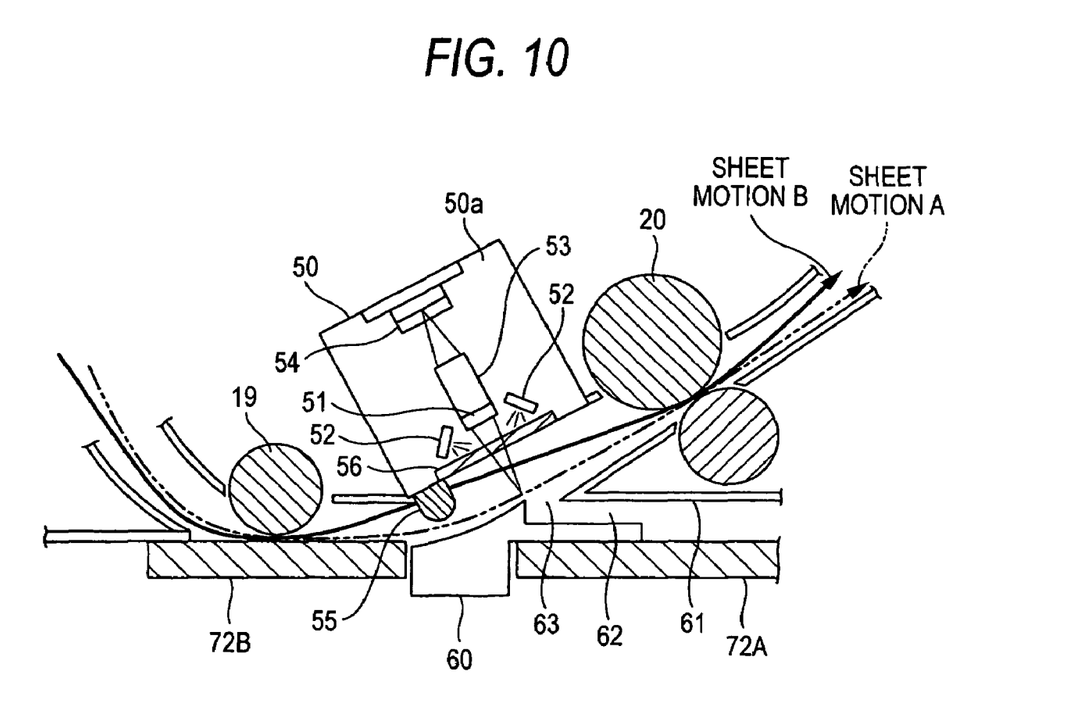
FIG. 10 is a drawing for describing another structure example of the CIS.

Furthermore, in this embodiment, the filter 51 also simultaneously serves as a cover of the CIS 50, however, the invention is not limited to this, and it is also possible that, for example, as shown in FIG. 10, the filter 51 is disposed in close contact with the selfoc lens 53 provided inside the CIS 50 and a glass-made cover 56 is attached to the opening side of the CIS 50. In this case, light emitted from the LED 52 permeates the filter 51 only once before reaching the line sensor 54, so that the filter 51 is designed by considering this.

The foregoing description of preferred embodiments of the invention has been presented for purposes of illustration and description. It is not intended to be exhaustive or to limit the invention to the precise form disclosed, and modifications and variations are possible in light of the above teachings or may be acquired from practice of the invention. The embodiments were chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An image reading apparatus comprising:
    a first reading unit that captures an image on a first side of a document, the first reading unit including a first light source for emitting light to the first side of the document from one side of a transfer path on which the document is conveyed and a first sensor for receiving light reflected from the first side of the document;
    a second reading unit that captures an image on a second side of the document, the second reading unit including a second light source, which has emission characteristics different from those of the first light source, for emitting light to the second side of the document from the other side of the transfer path and a second sensor for receiving light reflected from the second side of the document; and
    a filter that is provided between the second light source and the transfer path and brings the emission characteristics of the light emitted from the second light source onto the document closer to those of the light emitted from the first light source onto the document.

2. The image reading apparatus according to claim 1, wherein
    the first light source is a xenon lamp, and
    the second light source is a white LED.

3. The image reading apparatus according to claim 1, wherein
    the first sensor is a first image sensor for capturing the light reflected from the first side of the document through a minification optical system, and
    the second sensor is a second image sensor for capturing the light reflected from the second side of the document from a distance shorter than that of the first sensor.

4. The image reading apparatus according to claim 1, wherein the filter simultaneously serves as a cover for protecting the second reading unit.

5. The image reading apparatus according to claim 1, further comprising:
    a main body; and
    a document feeder that is provided separately from the main body in a manner capable of being opened and closed with respect to the main body, wherein
    the first reading unit is provided in the main body, and
    the second reading unit is provided in the document feeder.

6. The image reading apparatus according to claim 5, wherein the document feeder further includes an inverting transfer path for inverting front and back sides of a document whose image has been captured by the first sensor and conveying the document to the transfer path.

7. The image reading apparatus according to claim 1, further comprising:
    an image reading control unit that controls the first sensor and the second sensor to read the first side and the second side of the document when a color reading of the document is specified, and controls the first sensor to read the first side and the second side of the document when a monochrome reading of the document is specified.

8. An image reading apparatus comprising:
    a first reading unit that captures an image on a first side of a document as at least one of a color image and a monochrome image, the first reading unit including a first white light source for emitting light to the first side of the document from one side of a transfer path on which the document is conveyed and a first sensor for receiving light reflected from the first side of the document; and
    a second reading unit that captures an image on a second side of the document as a monochrome image, the second reading unit including a second white light source for emitting light to the second side of the document from the other side of the transfer path and a second sensor for receiving light reflected from the second side of the document, wherein a wavelength distribution of the first white light source is different from a wavelength distribution of the second white light source, wherein the second reading unit further includes a filter for matching a wavelength distribution of at least one of the light emitted from the second white light source onto the document and the light reflected from the second side of the document with a wavelength distribution of the light emitted from the first white light source.

9. The image reading apparatus according to claim 8, wherein the first white light source emits the light by means of gas discharge, and the second white light source emits the light by means of electroluminescence.

10. The image reading apparatus according to claim 8, further comprising a main body; and a document feeder that is provided separately from the main body in a manner capable of being opened and closed with respect to the main body, wherein the first reading unit is provided in the main body, and the second reading unit is provided in the document feeder.

11. The image reading apparatus according to claim 10, wherein the document feeder further includes an inverting transfer path for inverting front and back sides of a document whose image has been captured by the first sensor and conveying the document to the transfer path.

12. The image reading apparatus according to claim 8, further comprising:

an image reading control unit that controls the first sensor and the second sensor to read the first side and the second side of the document when a color reading of the document is specified, and controls the first sensor to read the first side and the second side of the document when a monochrome reading of the document is specified.

13. An image reading module comprising:

a white LED that emits light to a document;

a monochrome line sensor that captures light emitted from the white LED and reflected from the document;

a housing that houses the white LED and the monochrome line sensor; and a filter that corrects a profile of at least one of the light emitted from the white LED and the light reflected from the document to a predetermined profile, wherein the filter brings emission characteristics of the light emitted from the white LED onto the document closer to those of light emitted from a light source that is different from the white LED in the emission characteristics onto the document.

14. The image reading module according to claim 13, further comprising a selfoc lens provided in the housing, which condenses the light reflected from the document and outputs the condensed light to the monochrome line sensor.

15. The image reading module according to claim 13, wherein the white LED generates white light by an LED, which emits one of blue light and light having a near-ultraviolet wavelength, and a fluorescent material that fluoresces based on the emission of the LED.

* * * * *